US012766063B2

(12) United States Patent
Lee et al.

(10) Patent No.: US 12,766,063 B2
(45) Date of Patent: Oct. 20, 2026

(54) WEARING MODULE AND MOTION ASSISTANCE DEVICE COMPRISING SAME

(71) Applicant: SAMSUNG ELECTRONICS CO., LTD., Suwon-si (KR)

(72) Inventors: Minhyung Lee, Suwon-si (KR); Younbaek Lee, Suwon-si (KR); Se-gon Roh, Suwon-si (KR); Byungjune Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 929 days.

(21) Appl. No.: 18/091,931

(22) Filed: Dec. 30, 2022

(65) Prior Publication Data

US 2023/0146202 A1 May 11, 2023

Related U.S. Application Data

(63) Continuation of application No. PCT/KR2021/001344, filed on Feb. 2, 2021.

(30) Foreign Application Priority Data

Jun. 30, 2020 (KR) ........................ 10-2020-0080154
Nov. 24, 2020 (KR) ........................ 10-2020-0158956

(51) Int. Cl.
*A61H 3/00* (2006.01)
*A61H 1/02* (2006.01)

(52) U.S. Cl.
CPC ............ *A61H 1/0237* (2013.01); *A61H 3/00* (2013.01); *A61H 2003/007* (2013.01);
(Continued)

(58) Field of Classification Search
CPC .. A61H 1/0237; A61H 1/0281; A61H 1/0244; A61H 3/00; A61H 2003/007;
(Continued)

(56) References Cited

U.S. PATENT DOCUMENTS

2010/0198116 A1 8/2010 Hirata et al.
2011/0160626 A1* 6/2011 Takahashi ............ A61H 1/0244 601/34
(Continued)

FOREIGN PATENT DOCUMENTS

CA 3 006 519 A1 11/2018
CN 201986725 U 9/2011
(Continued)

OTHER PUBLICATIONS

European Extended Search Report dated Sep. 14, 2023 for EP Application No. 21834200.4.
(Continued)

*Primary Examiner* — Bradley H Philips
*Assistant Examiner* — Kira B Daher
(74) *Attorney, Agent, or Firm* — Nixon & Vanderhye P.C.

(57) ABSTRACT

A wearable module, for a wearable device, may include: a cover comprising a cover body and a cover hole penetratingly formed in the cover body; a support part including a support body made from a material that is more flexible than that of the cover, a support head that is connected to the support body and that can be attached/detached to/from the cover body, and an attachment part, which is connected to the support body, is positioned on the opposite side of the support head with respect to the support body, and passes through the cover hole to be attached to the outer surface of the support body; and an elastic layer of which a portion is fixed to the support part and which can move relative to the cover.

14 Claims, 11 Drawing Sheets

(52) U.S. Cl.
CPC ................ *A61H 2201/1215* (2013.01); *A61H 2201/164* (2013.01); *A61H 2201/165* (2013.01)

(58) Field of Classification Search
CPC .... A61H 2201/1654; A61H 2201/1676; A61H 2201/163–1652; B25J 9/0006; A61F 5/05–05891; A61F 5/24
USPC .......................................................... 602/36
See application file for complete search history.

(56) References Cited

U.S. PATENT DOCUMENTS

| | | | | |
|---|---|---|---|---|
| 2011/0218466 | A1 | 9/2011 | Takahashi et al. | |
| 2012/0316476 | A1 | 12/2012 | Shimizu et al. | |
| 2016/0015589 | A1 | 1/2016 | Lee et al. | |
| 2016/0022440 | A1 | 1/2016 | Ha et al. | |
| 2017/0143574 | A1* | 5/2017 | Choi | A61H 3/00 |
| 2017/0181882 | A1* | 6/2017 | Chisena | A61F 5/30 |
| 2018/0361565 | A1* | 12/2018 | Angold | B25J 9/106 |
| 2019/0060154 | A1 | 2/2019 | Lee et al. | |
| 2019/0091094 | A1* | 3/2019 | Romo | B25J 9/0006 |
| 2019/0283236 | A1* | 9/2019 | Nam | A61H 1/0237 |
| 2020/0179218 | A1* | 6/2020 | Katoh | A61H 1/0244 |

FOREIGN PATENT DOCUMENTS

| | | | |
|---|---|---|---|
| CN | 105595544 | A | 5/2016 |
| CN | 106377357 | A | 2/2017 |
| CN | 108451749 | | 8/2018 |
| CN | 109771226 | | 5/2019 |
| CN | 110074948 | | 8/2019 |
| DE | 102019132925 | A1 | 6/2020 |
| EP | 3 103 426 | A1 | 12/2016 |
| JP | 5578031 | | 8/2014 |
| KR | 10-2011-0103530 | | 9/2011 |
| KR | 10-2019-0021665 | | 3/2019 |
| KR | 10-2019-0108861 | | 9/2019 |

OTHER PUBLICATIONS

Chinese Office Action dated Nov. 7, 2024 for CN Application No. 202180046774.6.
International Search Report for PCT/KR2021/001344 dated May 20, 2021, 5 pages.
Written Opinion of the ISA for PCT/KR2021/001344 dated May 20, 2021, 3 pages.
European Notice of Allowance dated May 14, 2025 for EP Application No. 21834200.4.
Korean Notice of Allowance dated Jul. 31, 2025 for KR Application No. 10-2020-0158956.
Chinese Notice of Allowance dated Aug. 27, 2025 for CN Application No. 202180046774.6.
Chinese Office Action dated May 29, 2025 for CN Application No. 202180046774.6.

* cited by examiner

WEARING MODULE AND MOTION ASSISTANCE DEVICE COMPRISING SAME

CROSS-REFERENCE TO RELATED APPLICATIONS

This application is a continuation application of International Application PCT/KR2021/001344 designating the United States, filed on Feb. 2, 2021, in the Korean Intellectual Property Receiving Office and claiming priority to Korean Patent Application No. 10-2020-0080154, filed on Jun. 30, 2020, and Korean Patent Application No. 10-2020-0158956, filed on Nov. 24, 2020, in the Korean Intellectual Property Office, the disclosures of which are all hereby incorporated by reference herein in their entireties.

BACKGROUND

1. Field

Certain example embodiments relate to a wearable module and/or a motion assistance device including the wearable module.

2. Description of Related Art

A motion assistance device may be a mechanism or a device that helps a user (e.g., a patient, who cannot walk on his/her own due to various diseases, accidents, and the like) perform activity such as exercise for rehabilitation treatment or any other reason. With the recent intensifying aging societies, a growing number of people experience inconvenience in exercising or have difficulty in normal exercising due to malfunctioning joint issues, and there is increasing interest in motion assistance devices. A motion assistance device may be worn on a body of a user to assist the user to exercise by providing a necessary muscular strength and induce the user to walk so that the user may exercise normally.

In general, users wearing a motion assistance device may be, for example and without limitation, people with physical disabilities. For these people, a process of wearing a motion assistance device itself may be difficult. There is a demand for a technology of allowing a user with physical disabilities to wear a motion assistance device alone, without the help of other people. Users without disabilities may also be users of such exercise assistance devices.

SUMMARY

According to an example embodiment, a wearable module may include: a cover including a cover body and a cover hole formed through the cover body; a support part including a support body formed of a material that is more flexible than a material of the cover, a support head that is connected to the support body and detachable from the cover body, and an attachment part that is connected to the support body, that is positioned on an opposite side of the support head with respect to the support body and that passes through the cover hole to be attached to an outer surface of the support body; and an elastic layer that is partially fixed to the support part and that is movable relative to the cover.

A portion of the elastic layer may be fixed, directly or indirectly, to an inner surface of the support body, and another portion of the elastic layer may be slidable along an inner surface of the cover body.

The wearable module may include a main guide connected to the cover and configured to guide sliding of the elastic layer.

The elastic layer may move toward the support head while the attachment part is moving toward the support head by passing through the cover, based on a state in which the support head is mounted on the cover.

The wearable module may include a cushion part connected to the main guide and positioned on an opposite side of the support body with respect to the main guide.

When a distance between the support head and the cover increases, a potential energy of the elastic layer may increase.

The elastic layer may have a minimum potential energy in a state in which the support head is mounted on the cover.

The support head may be formed of a material more rigid than that of the support body.

The wearable module may include an auxiliary guide connected to the support part and configured to guide a movement of the elastic layer.

The wearable module may include a belt having one end fixed to the cover and another end fixed to the support part or the auxiliary guide.

The wearable module may include a belt guide connected to the support part and configured to support the belt.

The support part may be detachable from the cover by a magnetic force.

According to an example embodiment, a wearable motion assistance device may include: a main frame; an actuator disposed on the main frame; a driving frame rotatable by receiving power from the actuator; a cover connected to the driving frame; a support part including a support body formed of a material that is more flexible than a material of the cover, a support head that is connected to the support body and detachable from the cover, and an attachment part that is formed in an end portion of the support body and attached to the support body by passing through the cover; and an elastic layer that is partially fixed to the support part and that is movable relative to the cover.

A portion of the elastic layer may be fixed, directly or indirectly, to an inner surface of the support body, and another portion of the elastic layer may be slidable along an inner surface of the cover.

The motion assistance device may further include a main guide connected, directly or indirectly, to the cover and configured to guide sliding of the elastic layer.

When a distance between the support head and the cover increases, a potential energy of the elastic layer may increase.

The main frame may be configured to support a waist of a user, and the cover and the support part may be configured to wrap around a thigh of the user.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
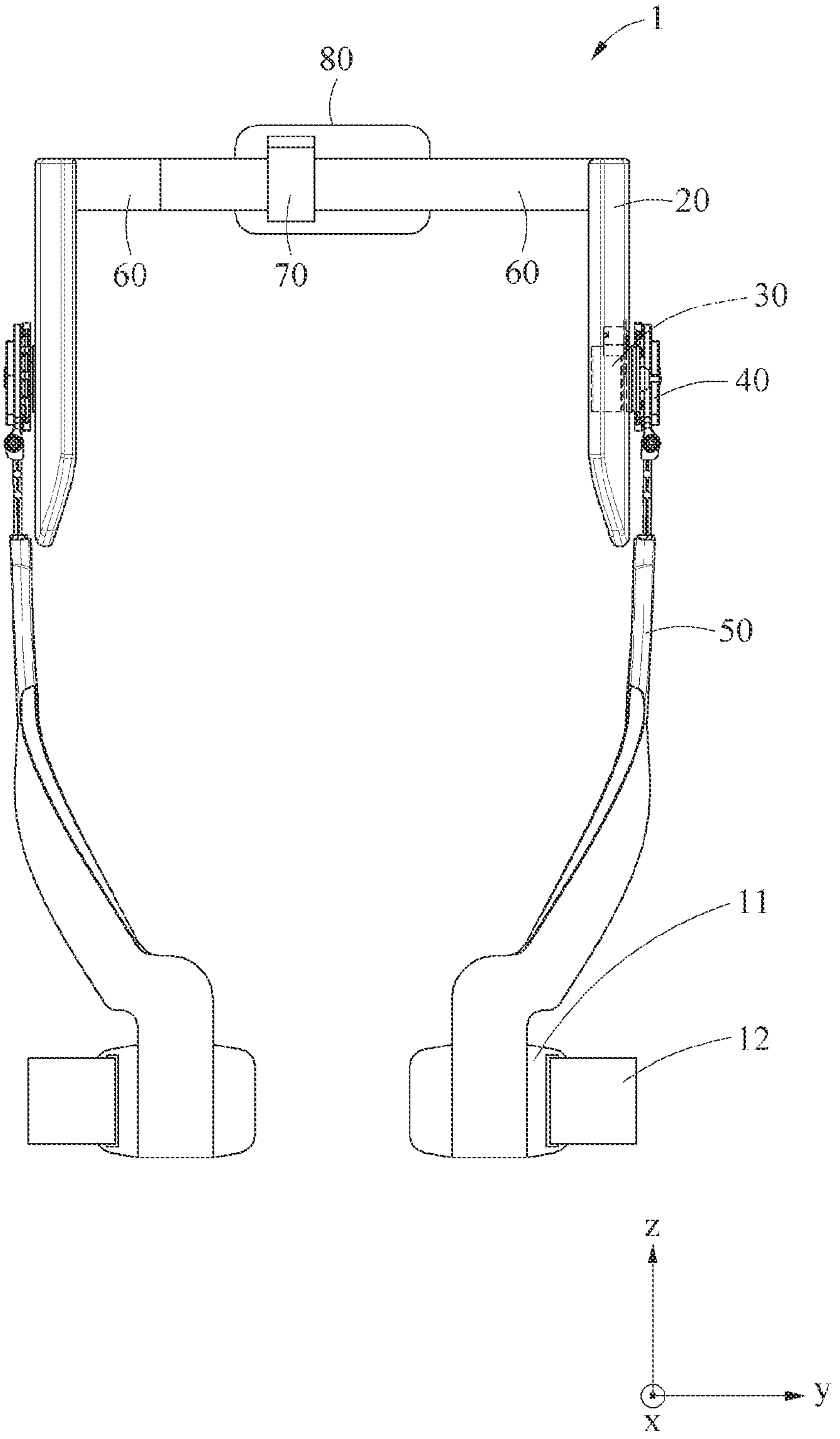
FIG. 1 is a front view of a motion assistance device according to an example embodiment.

The following detailed structural or functional description is provided as an example only and various alterations and modifications may be made to example embodiments. Accordingly, the example embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments will be described in detail with reference to the accompanying drawings. When describing the example embodiments with reference to the accompanying drawings, like reference numerals refer to like elements and any repeated description related thereto will be omitted.

Figure 2:
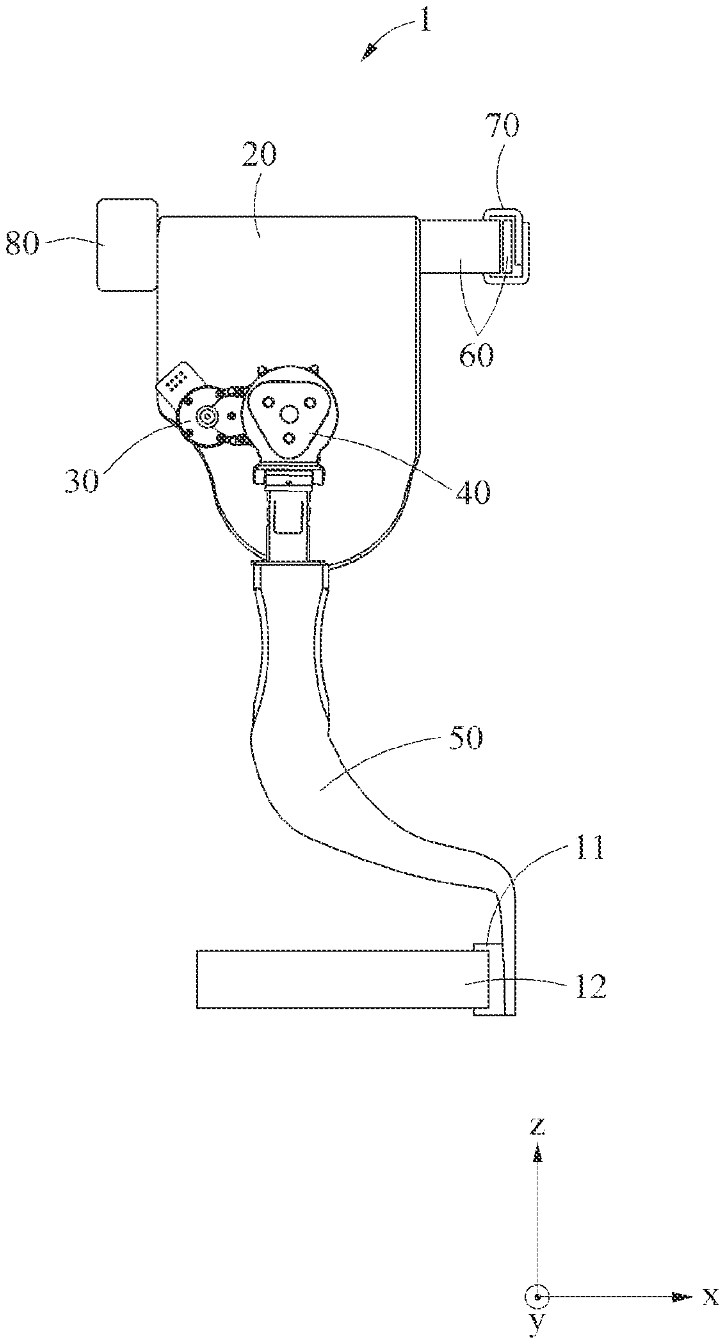
FIG. 2 is a side view of a motion assistance device according to an example embodiment.

FIG. 1 is a front view of a motion assistance device according to an example embodiment, and FIG. 2 is a side view of the motion assistance device according to an example embodiment.

Referring to FIGS. 1, and 2, a motion assistance device 1 may be worn by a user and assist a motion of the user (e.g., to help a user walk, and/or to assist a user with exercise and/or rehabilitation). The user may be, for example, a human, an animal, or a robot, but is not limited thereto. In addition, although FIG. 1 illustrates an example in which the motion assistance device 1 assists a motion of a thigh of the user, the motion assistance device 1 may assist a motion of another part of an upper body, for example, a hand, an upper arm, and a lower arm of the user, or a motion of another part of a lower body, for example, a foot, and a calf of the user. In other words, the motion assistance device 1 may assist a motion of a portion of the user. Hereinafter, an example in which the motion assistance device 1 assists the motion of the thigh of the user will be described.

The motion assistance device 1 may include a main body 80, a pair of main frames 20, a pair of straps 60, an auxiliary strap 70 connected to one of the pair of straps 60, an actuator 30, a joint member 40, a driving frame 50, a cover 11, and a support part 12. Strap(s) 60 may be wearable around at least part of the waist of a user, each driving frame may be provided proximate a respective thigh of the user, each main frame 20 may be configured to be worn proximate a respective hip of the user, and each support part 12 may be attached to a respective thigh of the user.

The motion assistance device 1 may individually support a proximal part and a distal part of the user, to assist in a relative movement between the proximal part and the distal part. Components of the motion assistance device 1 to be worn on the proximal part of the user may be referred to as "proximal wearing units," and components worn on the distal part may be referred to as "wearable modules or wearing modules" (or distal wearing units). For example, the main body 80, the pair of main frames 20, the pair of straps 60, and the auxiliary strap 70 among the components of the motion assistance device 1 may correspond to a proximal wearing unit(s), and the cover 11 and the support part 12 may correspond to a wearable module. For example, the proximal wearing unit may be worn on a waist or pelvis of the user, and the wearable module may be worn on a thigh or calf of the user. It should be noted that positions in which the proximal wearing unit and the wearable module are worn are not limited thereto. For example, the proximal wearing unit may be worn on a torso or shoulder of the user, and the wearable module may be worn on an upper arm or lower arm of the user.

The main body 80 may accommodate a controller (not shown) configured to control the actuator 30, and a power supply (not shown) configured to supply power to the actuator 30. For example, the main body 80 may be disposed on a back side of the user, based on a state in which the motion assistance device 1 is worn on a body of the user.

The pair of main frames 20 may be connected to the main body 80. The main frames 20 may each support a portion of the body of the user. The main frame 20 may contact at least a portion of an external surface of the user. Each main frame 20 may have a shape to wrap around the exterior of the user along the exterior of the user. Each main frame 20 may be formed to be curved in a shape corresponding to a contact portion of the user. In other words, Each main frame 20 may include a curved surface in contact with the user. For example, each main frame 20 may support the waist of the user and/or may be configured to be worn proximate a respective hip of the user.

The pair of straps 60 may be connected to the pair of main frames 20. The pair of straps 60 may be maintained in a state of extending forward (in a +x direction), before the user wears the motion assistance device 1, and may not hinder the user from wearing the pair of main frames 20. In a state in which the user wears the pair of main frames 20, the pair of straps 60 may be transformed and wrap around a front portion of the user as shown in the drawing. The main body 80, the pair of main frames 20, and the pair of straps 60 may entirely wrap around the circumference of the waist of the user.

The pair of auxiliary straps 70 may fix the pair of straps 60 to each other in a state in which the straps 60 overlap each other. For example, one of the pair of straps 60 may wrap the other strap together with the pair of auxiliary straps 70.

The actuator 30 may provide power to be transmitted to the joint member 40. The actuator 30 may include a motor configured to generate power by receiving voltage or current from a power supply. For example, the actuator 30 may be disposed in a lateral direction of the joint member 40. In other words, a rotation axis of the actuator 30 and a rotation axis of the joint member 40 may be spaced apart from each other. In this example, a height of a portion protruding from the user may decrease, in comparison to a case in which the actuator 30 and the joint member 40 share a rotation axis. In another example, unlike the drawings, the actuator 30 may be disposed to be spaced apart from the joint member 40. In this example, a power transmission module to transmit power from the actuator 30 to the joint member 40 may be provided. The power transmission module may be a rotary body, such as a gear, or a longitudinal member, such as a wire, a cable, a string, a rubber band, a spring, a belt, or a chain. However, in an example embodiment, a position and a power transmission structure of the actuator 30 are not limited.

Each joint member 40 may receive power from the corresponding actuator 30 to assist a motion of a joint portion (e.g., hip) of the user. Each joint member 40 may be disposed at a position corresponding to the joint portion of the user. Each joint member 40 may be disposed on one side of the corresponding main frame 20. One side of the joint member 40 may be connected to the actuator 30, and another side thereof may be connected to the driving frame 50, the cover 11, and the support part 12. The joint member 40 may be rotated by the power received from the actuator 30. An encoder to measure a rotation angle of the joint member 40 may be disposed on one side of the joint member 40.

The driving frame 50 may transmit an assistance force to assist a motion of a portion of the user. Here, the assistance force may be understood as a force acting in the same direction as a direction of a motion of a portion of the user. In other words, the assistance force may be understood as a force obtained by excluding a force applied in a direction intersecting the direction of the motion of the portion of the user from among forces applied to the portion of the user. One end portion of the driving frame 50 may be connected to the joint member 40 and may be rotated. Another end portion of the driving frame 50 may be connected to the support part 12 and may transmit an assistance force to a portion of the user. For example, the driving frame 50 may push or pull the thigh of the user. The driving frame 50 may extend in a longitudinal direction of the thigh of the user. The driving frame 50 may be bent to wrap around at least a portion of a circumference of the thigh of the user. For example, an upper portion of the driving frame 50 may cover a portion of the body of the user facing a side (+y direction or −y direction), and a lower portion of the driving frame 50 may cover a portion of the body of the user facing the front portion (+x direction).

The cover 11 may apply an assistance force to a portion of the user. The cover 11 may be disposed between the other end portion of the driving frame 50 and the support part 12. For example, the cover 11 may be disposed on one side of the thigh of the user to push or pull the thigh of the user. The cover 11 may be disposed on a front surface of the thigh of the user. The cover 11 may be disposed in a circumferential direction of the thigh of the user. The cover 11 may extend toward both sides around the other end portion of the driving frame 50. The cover 11 may include a curved surface corresponding to the thigh of the user.

The support part 12 may be connected to one side of the cover 11. For example, the support part 12 may be disposed to cover at least a portion of the circumference of the thigh of the user to prevent or reduce the chances of the thigh of the user from being separated from the driving frame 50.

Figure 3:
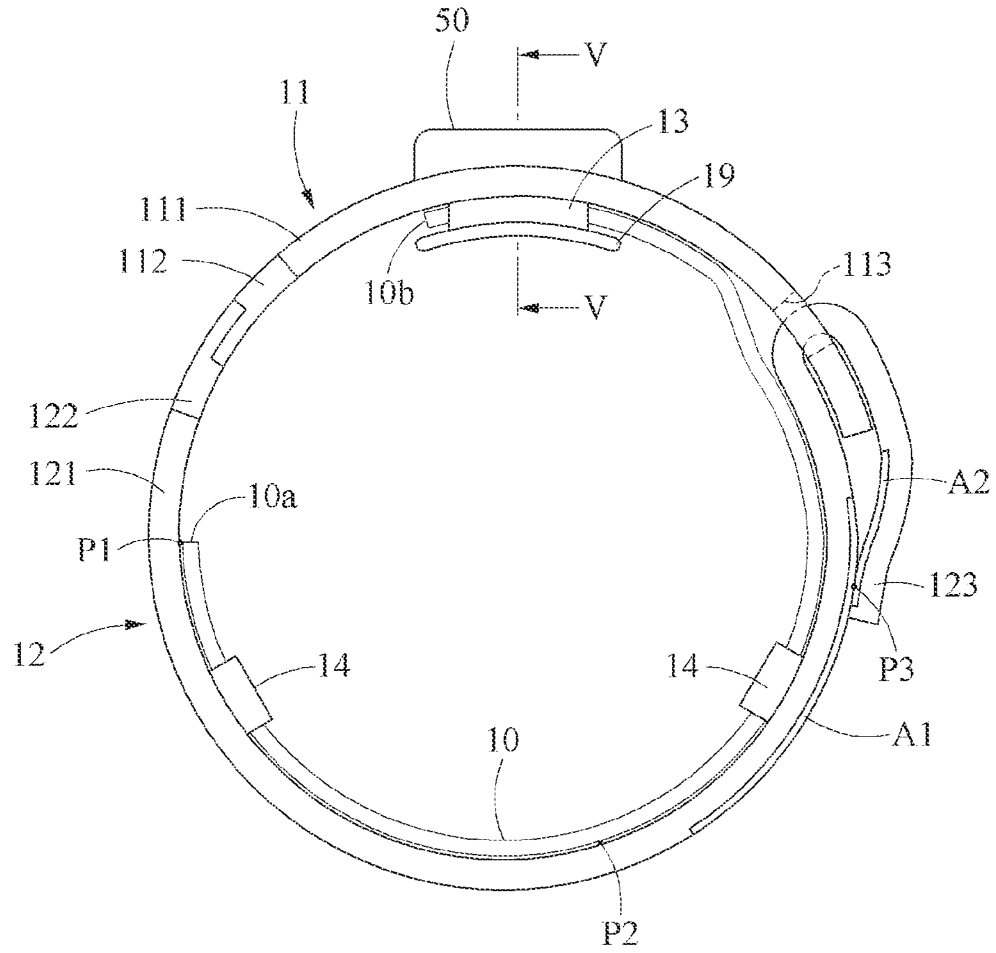
FIG. 3 is a plan view schematically illustrating an example of a wearable module of a wearable motion assistance device according to an example embodiment.
Figure 4:
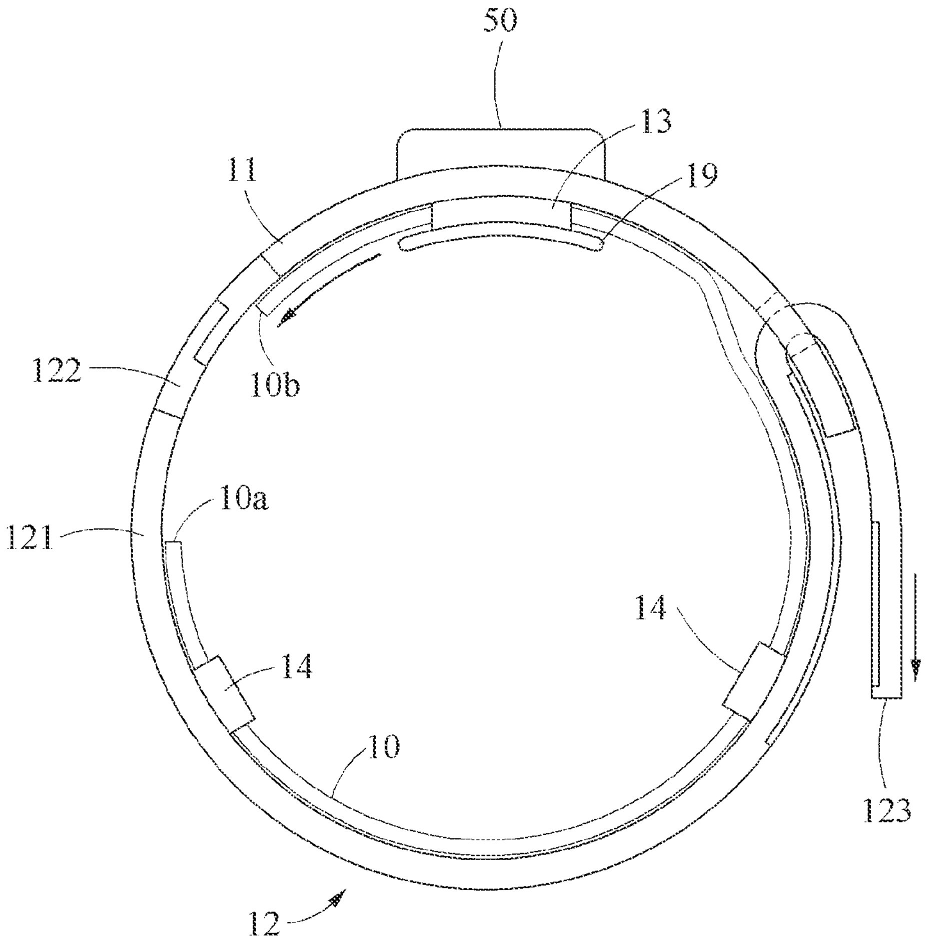
FIG. 4 is a plan view illustrating an example in which a size of a wearable module is adjusted according to an example embodiment.
Figure 5:
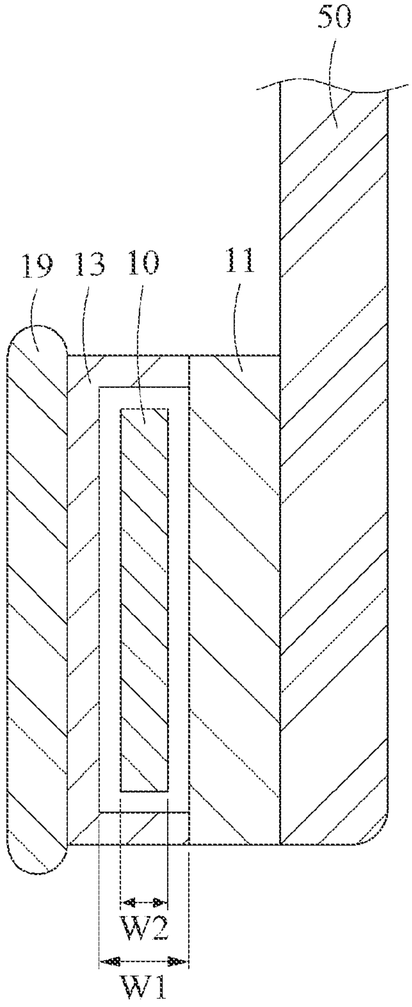
FIG. 5 is a cross-sectional view of the wearable module, taken along line V-V of FIG. 3.

FIG. 3 is a plan view schematically illustrating a wearable module of a motion assistance device according to an example embodiment, FIG. 4 is a plan view illustrating an example in which a size of a wearable module is adjusted according to an example embodiment, and FIG. 5 is a cross-sectional view of a wearable module, taken along line V-V of FIG. 3.

Referring to FIGS. 3 through 5, the motion assistance device may be easily worn on a body of a user through an elastic force. The motion assistance device may include a driving frame 50, a cover 11 connected to the driving frame 50, a support part 12 detachably connected to the cover 11, an elastic layer 10 provided in a longitudinal direction of the cover 11 and the support part 12, a main guide 13 configured to guide the elastic layer 10, an auxiliary guide 14, and a cushion part 19.

The cover 11 may transmit power of the driving frame 50 to the support part 12. The power of the driving frame 50 may be transmitted to the support part 12 through the cover 11 and may finally assist a motion of a joint (e.g., hip) of the user. The cover 11 may cover a portion of the body of the user. For example, the cover 11 may be disposed on a front portion of a thigh of the user and may be curved to wrap around a partial area of the front portion of the thigh. The cover 11 may include a cover body 111, a cover head 112 connected to the cover body 111, and a cover hole 113 formed through the cover body 111.

The support part 12 may support a distal portion of the user. The support part 12 may support the distal portion of the user together with the cover 11 by enclosing the distal portion. For example, the support part 12 and the cover 11 may wrap around the thigh of the user. The support part 12 may include a support body 121 that is formed of a material more flexible than that of the cover 11, a support head 122 that is connected to the support body 121 and detachable from a cover head 112, and an attachment part 123 that is connected to the support body 121, that is positioned on an opposite side of the support head 122 with respect to the support body 121 and that passes through the cover hole 113 to be attached to an outer surface of the support body 121.

The cover 11 and the support part 12 may have a shape that completely warps around the distal portion of the user based on a state in which the cover 11 and the support part 12 are coupled to each other. A first attachment area A1 and a second attachment area A2 to be attached to each other may be provided on a surface of the support body 121 and a surface of the attachment part 123, respectively. For example, the first attachment area A1 may be formed on the outer surface of the support body 121, and the second attachment area A2 may be formed on a surface of the attachment part 123 facing the support body 121. In an example, the first attachment area A1 and the second attachment area A2 may be Velcro areas. In another example, the first attachment area A1 and the second attachment area A2 may each include a plurality of buttons formed in a longitudinal direction.

Since the attachment part 123 has a shape of penetrating the cover 11, a size of an inner area of each of the cover 11 and the support part 12 may be adjusted using a scheme of moving the attachment part 123 through the cover hole 113, for example, a scheme of pulling the attachment part 123. Accordingly, the user may easily adjust a size of the wearable module.

The elastic layer 10 may be partially fixed to the support part 12 and may move relative to the cover 11. The elastic layer 10 may be movable in a circumferential direction of the cover 11 along the cover 11. Here, the circumferential direction may refer to a direction in which the cover 11 and the support part 12 cover the distal portion of the user. The elastic layer 10 may provide an elastic force to the support part 12 before the support part 12 and the cover 11 are coupled to each other, to assist the support part 12 to be coupled to the cover.

If a distance between the support head 122 and the cover 11 increases, potential energy of the elastic layer 10 may increase. In order for the user to wear the wearable module, a process of spreading the support part 12 is required first. Here, the spreading of the support part 12 may refer to an operation of providing a space into which the thigh of the user is to be put, by sufficiently spacing the support head 122 apart from the cover 11 by separating the support head 122 from the cover 11. In a state in which the thigh of the user is put into the cover 11 and the support part 12, the elastic layer 10 may provide a restoration force to the support part 12, and the support head 122 may be disposed adjacent to the cover 11. The user may easily attach the support part 12 to the cover 11 by easily holding the support head 122 disposed adjacent to the cover 11.

The cover head 112 and the support head 122 may each accommodate a magnet, and the cover 11 and the support part 12 may be detachably attached to each other by a magnetic force.

A partial area of the elastic layer 10 may be fixed to the support part 12, and another area thereof may be movable relative to the support part 12 and the cover 11. For example, in an area between a first point P1 and a second point P2 shown in FIG. 3, the elastic layer 10 may be fixed to the support part 12. For example, at least a portion of the elastic layer 10 may be fixed to an inner surface of the support body 121. Another portion of the elastic layer 10 may be movable relative to the cover 11. For example, the elastic layer 10 may be slidable along an inner surface of the cover body 111. When a point at which the first attachment area A1 of the support body 121 and the second attachment area A2 of the attachment part 123 are attached to each other is referred to as a third point P3, the elastic layer 10 may be slidable along the inner surface of the cover body 111 during a change in a distance by which the third point P3 is spaced apart from the cover hole 113.

The elastic layer 10 may have a minimum potential energy in a state in which the support head 122 is mounted on the cover 11. Due to such a feature, a durability of a portion of the elastic layer 10 fixed to the support part 12 may be enhanced.

The elastic layer 10 may include a first end 10*a* disposed in the support part 12, and a second end 10*b* disposed in the cover 11, based on the state in which the cover 11 and the support part 12 are coupled to each other. A distance by which the first end 10*a* is spaced apart from the support head 122 may remain unchanged. Meanwhile, a distance by which the second end 10*b* is spaced apart from the cover head 112 may vary according to a movement of the elastic layer 10.

The main guide 13 may be connected, directly or indirectly, to the cover 11 and guide the movement of the elastic layer 10. The main guide 13 may prevent or reduce the chance of the elastic layer 10 from being separated from the cover 11. The main guide 13 and the cover 11 may surround the elastic layer 10. The main guide 13 may be formed of a material more rigid than that of the support body 121. For example, the main guide 13 may be formed of a material that is relatively rigid and that is not easily transformed by an external force, in comparison to the support body 121. In addition, the main guide 13 may include an accommodation space for accommodating the elastic layer 10 therein. A width W1 of the accommodation space may be greater than a width W2 of the elastic layer 10. Based on such a structure, a phenomenon in which the main guide 13 is pressed by the body of the user may be reduced or prevented. As a result, sliding of the elastic layer 10 may be smoothly performed even in a state in which the wearable module is worn on the body of the user.

The cushion part 19 may be connected, directly or indirectly, to the main guide 13 and may be disposed on the opposite side of the support body 121 with respect to the main guide 13. The cushion part 19 may enhance the comfort that the user experiences when wearing the motion assistance device.

The auxiliary guide 14 may be connected to the support part 12 and may guide the movement of the elastic layer 10. The auxiliary guide 14 may prevent of reduce the chance of the elastic layer 10 from being separated from the support part 12. The auxiliary guide 14 and the support part 12 may surround the elastic layer 10.

In a process in which the user pulls the attachment part 123, the elastic layer 10 may move toward the support head 122 along the cover 11 while the attachment part 123 is moving toward the support head 122 by passing through the cover 11, based on the state in which the support head 122 is mounted on the cover 11. In the above process, the distance by which the first end 10*a* of the elastic layer 10 is spaced apart from the support head 122 may be maintained, and the second end 10*b* of the elastic layer 10 may approach the support head 122.

Figure 6:
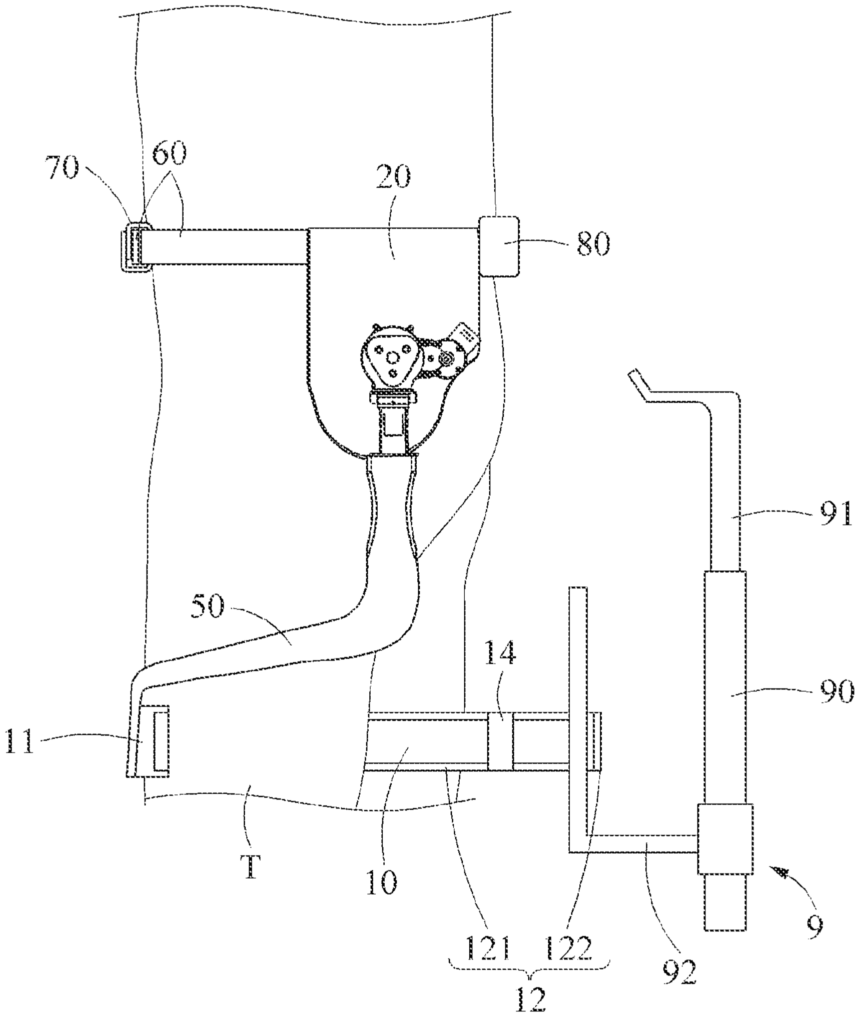
FIG. 6 is a side view schematically illustrating an example in which a user wearing a motion assistance device moves forward according to an example embodiment.
Figure 7:
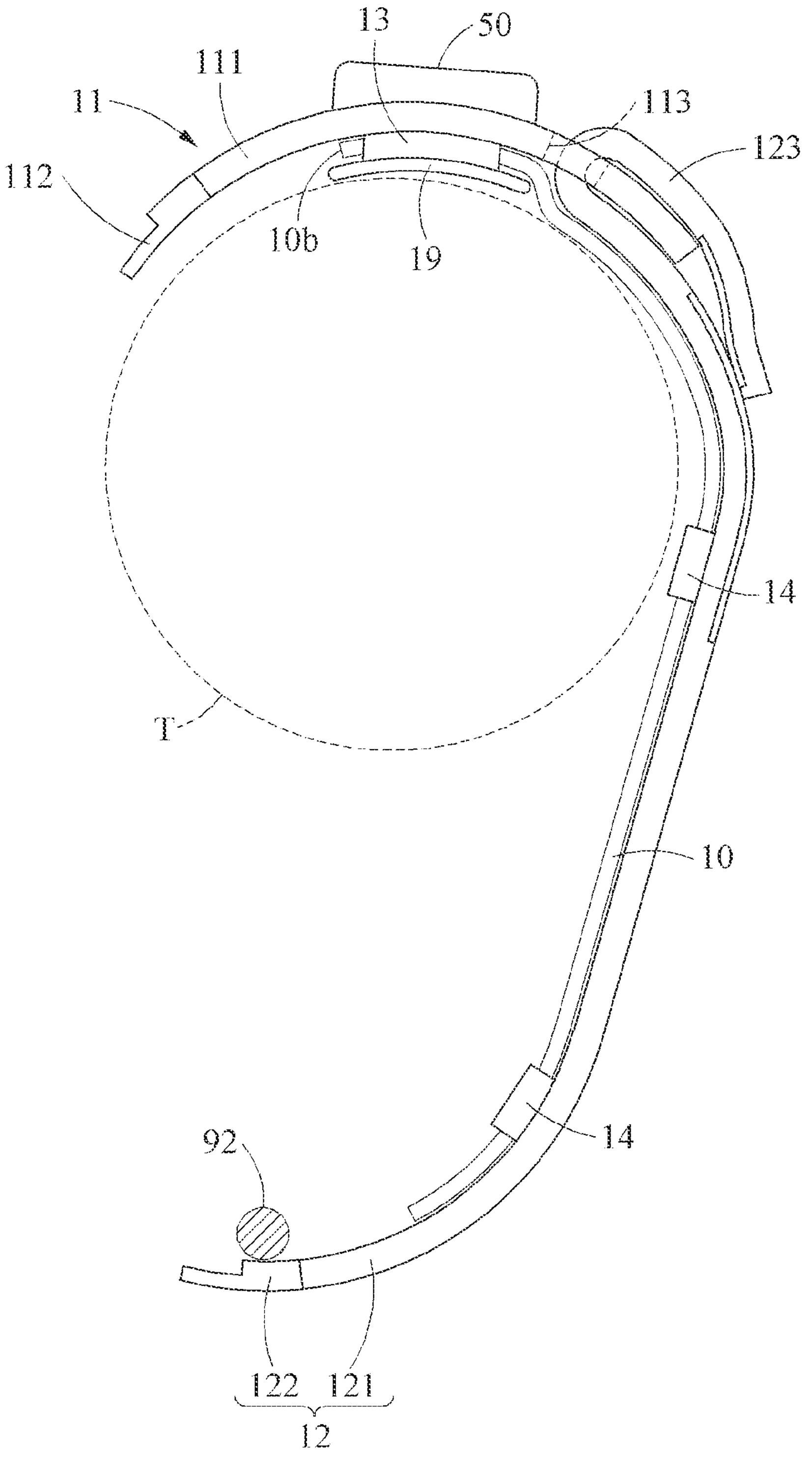
FIG. 7 is a plan view schematically illustrating a state of a wearable module in the example of FIG. 6.

FIG. 6 is a side view schematically illustrating an example in which a user wearing a motion assistance device moves forward according to an example embodiment, and FIG. 7 is a plan view schematically illustrating a state of a wearable module in the example of FIG. 6.

Referring to FIGS. 6 and 7, the motion assistance device may be placed on a cradle 9. The cradle 9 may include a cradle body 90, a cradle head 91 that is connected to an upper side of the cradle body 90 and that is capable of supporting the main body 80 of the motion assistance device, and a cradle arm 92 that is connected to the cradle body 90 and that is disposed inside the wearable module of the motion assistance device.

The user may first wear a proximal wearing unit of the motion assistance device. For example, the user may wear the proximal wear unit by a scheme in which the main body 80, the main frame 20, and the strap 60 wrap around his or her waist or pelvis and in which the strap 60 is fixed with the auxiliary strap 70.

Next, the user may move forward by putting a thigh of the user into the corresponding wearable module (e.g., right thigh first into one module, then left thigh into the other module, or vice versa). While the user is moving forward, the support part 12 and the elastic layer 10 caught on the cradle arm 92 may be stretched out relatively flat, and the potential energy of the elastic layer 10 may increase. The second end 10*b* of the elastic layer 10 may move away from the cover head 112, while the user is moving forward. Since the support part 12 is provided in a state in which the attachment part 123 is attached to the support body 121 by passing through the cover hole 113, the support part 12 may be hung on the cover 11. Even in a state in which a thigh T of the user is not completely worn on the wearable module, the elastic layer 10 may be guided by the main guide 13 and the auxiliary guide 14, and accordingly the thigh T may not be separated from the cover 11 or the support part 12.

FIG. 7 shows a state in which the cradle arm 92 is hung on the support head 122. If the user moves slightly further forward, the cradle arm 92 may be further separated from the support head 122. Here, the support head 122 may be moved toward the cover head 112 by the restoration force of the elastic layer 10. As a result, the support head 122 may be disposed adjacent to the cover head 112. The user may easily mount the support head 122 to the cover head 112 by holding the support head 122 adjacent to the cover head 112 with a hand. The user may easily hold the support head 122, without excessively turning the waist or correcting a posture.

Figure 8:
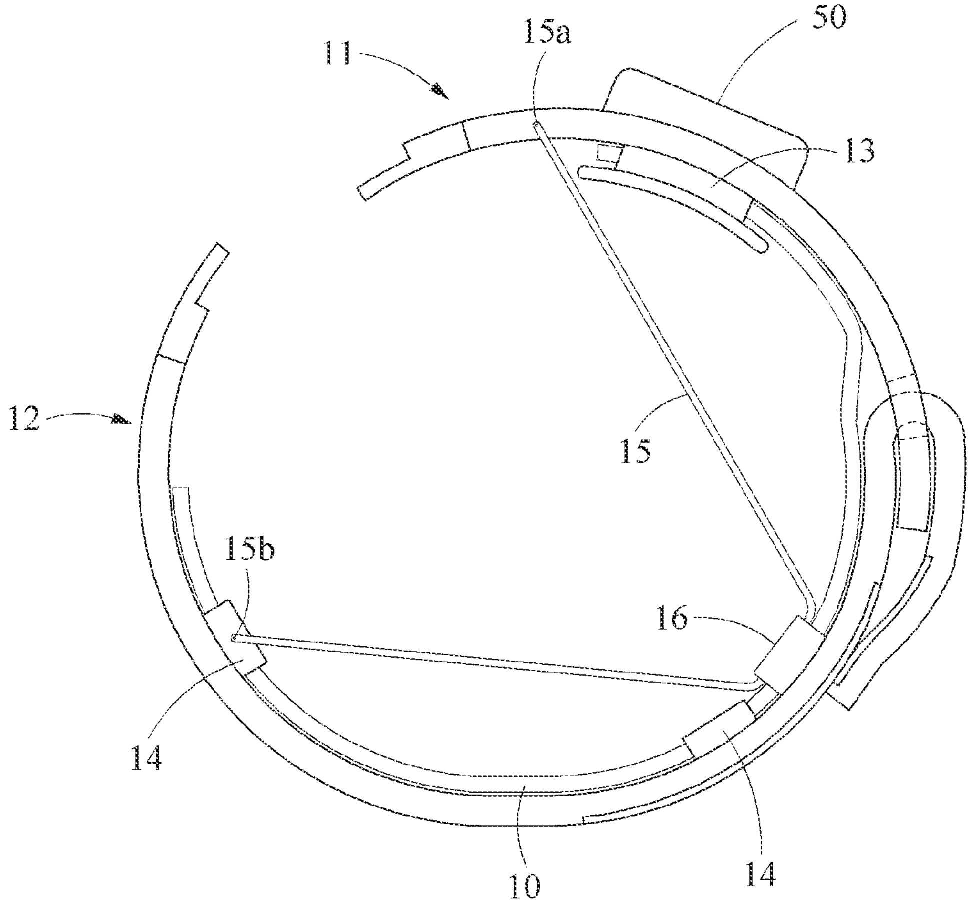
FIGS. 8 and 9 are plan views schematically illustrating another example of a wearable module according to an example embodiment.
Figure 9:
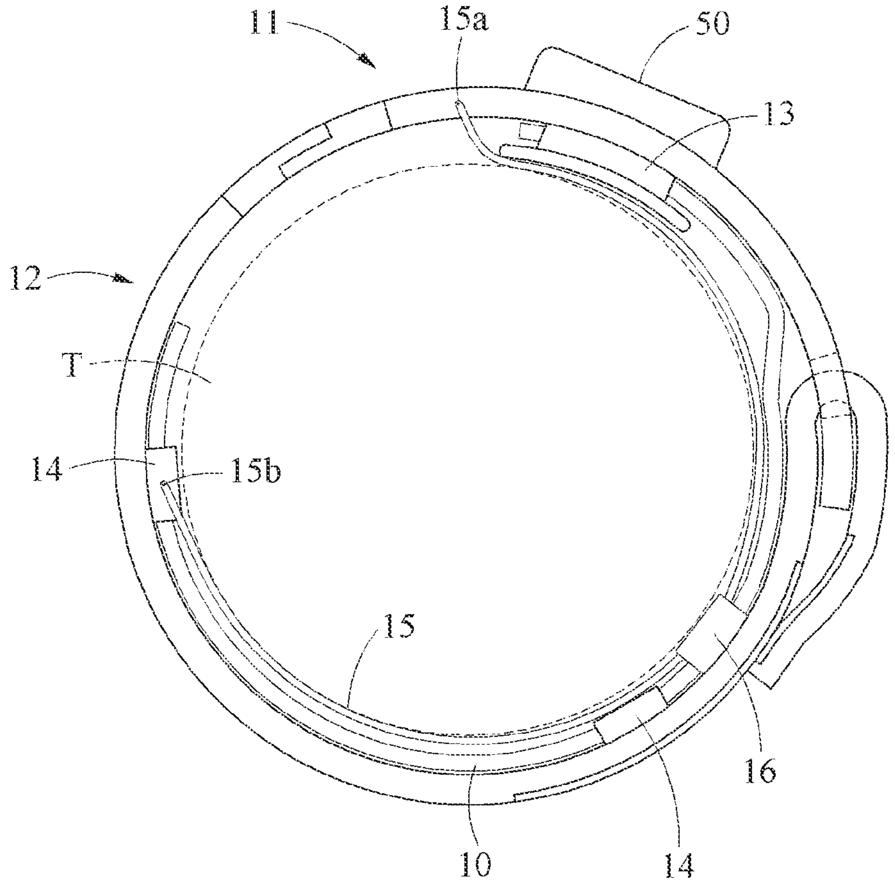

FIGS. 8 and 9 are plan views schematically illustrating another example of a wearable module according to an example embodiment.

Referring to FIGS. 8 and 9, a motion assistance device may include a driving frame 50, a cover 11 connected, directly or indirectly, to the driving frame 50, a support part 12 detachably connected to a cover head 112, an elastic layer 10 provided in a longitudinal direction of the cover 11 and the support part 12, a main guide 13 and an auxiliary guide 14 that are configured to guide the elastic layer 10, a belt 15 configured to set a shape of each of the cover 11 and the support part 12 in a state in which an external force is not applied, and a belt guide 16 configured to support the belt 15.

The belt 15 may have a first end 15*a* fixed to the cover 11, and a second end 15*b* fixed to the support part 12 or the auxiliary guide 14. When the thigh T of the user is put into the cover 11 and the support part 12, the belt 15 may contact the thigh T before the cover 11 and the support part 12 contact the thigh T. The belt 15 may be pressed by the thigh T. As the belt 15 is pressed, a support head 122 of the support part 12 may approach the cover head 112. The second end 15*b* of the belt 15 is fixed to the auxiliary guide 14 as shown in the drawings, however, it should be noted that the example embodiments are not limited thereto. For example, the second end 15*b* of the belt 15 may be fixed to an area of the support part 12 in which the elastic layer 10 is not provided. The belt 15 may not interfere with the elastic layer 10.

The belt guide 16 may support the belt 15, to adjust a maximum distance by which the belt 15 is spaced apart from the cover 11 or the support part 12. For example, the belt guide 16 may support a central area of the belt 15 so that the central area of the belt 15 may be disposed close to an inner surface of the support part 12.

Figure 10:
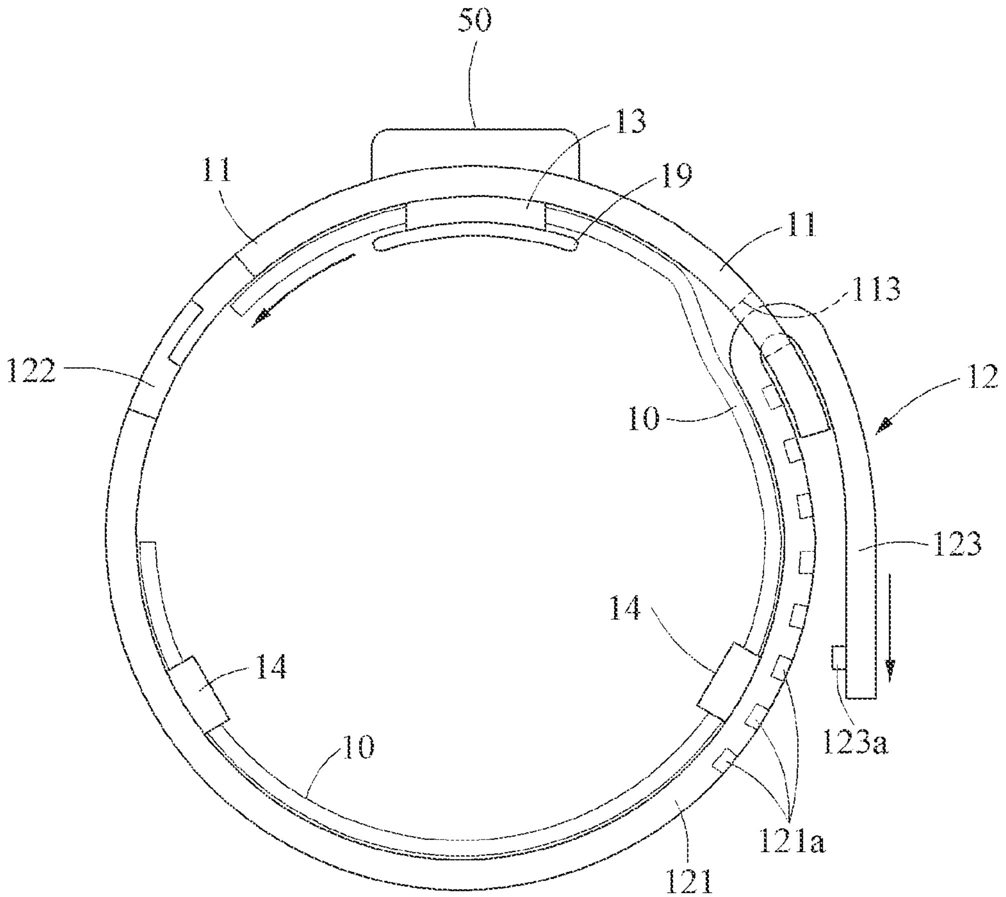
FIG. 10 is a plan view schematically illustrating another example of a wearable module of a motion assistance device according to an example embodiment.

FIG. 10 is a plan view schematically illustrating another example of a wearable module of a motion assistance device according to an example embodiment.

Referring to FIG. 10, a wearable module connected to a driving frame 50 may support a portion of a body of a user. The wearable module may include a cover 11, a support part 12, an elastic layer 10, a main guide 13, an auxiliary guide 14, and a cushion part 19. The cover 11 may include a cover hole 113 through which the support part 12 passes. The support part 12 may include a support body 121 that is formed of a material more flexible than that of the cover 11, a support head 122 that is connected, directly or indirectly, to the support body 121 and detachable from a cover head 112, and an attachment part 123 that is connected, directly or indirectly, to the support body 121, that is positioned on an opposite side of the support head 122 with respect to the support body 121 and that passes through the cover hole 113 to be attached to an outer surface of the support body 121.

The support body 121 may include a plurality of coupling grooves 121*a* formed on the outer surface in a longitudinal direction. The attachment part 123 may include a coupling protrusion 123*a* that may be inserted into one of the plurality of coupling grooves 121*a*. Since the plurality of coupling grooves 121*a* is recessed from the outer surface of the support body 121, a portion of the support body 121 may not interfere with the cover 11 while passing through the cover hole 113.

Figure 11:
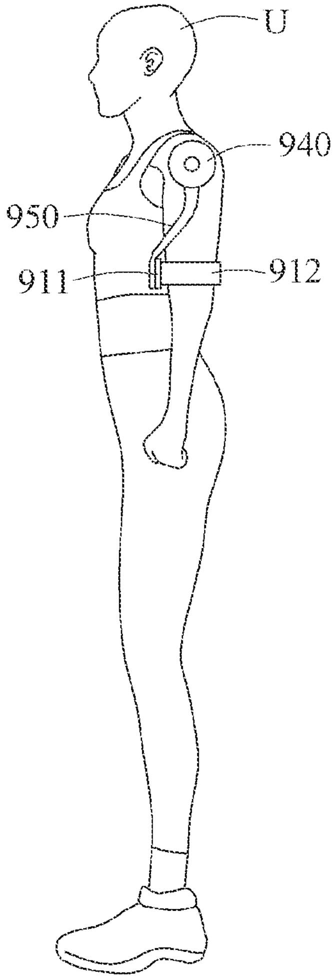
FIG. 11 is a view illustrating an example in which a wearable module of a motion assistance device is worn on an upper arm of a user, according to an example embodiment.

FIG. 11 is a view illustrating an example in which a wearable module of a motion assistance device is worn on an upper arm of a user (see "U" in FIG. 11), according to an example embodiment.

Referring to FIG. 11, the wearable module of the motion assistance device may be mounted on the upper arm of the user. For example, a joint member 940 of the motion assistance device may be provided near a shoulder of the user, and a driving frame 950 may be connected to the joint member 940 and arranged along the upper arm of the user. A cover 911 may be connected, directly or indirectly, to an end portion of the driving frame 950 to support a portion of the upper arm of the user. A support part 912 may be connected, directly or indirectly, to the cover 911 to support the other portions of the upper arm. An elastic layer (not shown) may be provided inside the cover 911 and the support part 912. The joint member 940 may rotate the driving frame 950 by receiving power from an actuator (not shown).

Although the example embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Therefore, other implementations, other example embodiments, and/or equivalents of the claims are within the scope of the following claims.

The invention claimed is:

1. A wearable module configured to be operatively connected to a driving frame to transmit an assistance force, the wearable module comprising:

a cover comprising a cover body, and a cover hole formed through the cover body;

a support comprising: a support body comprising a material that is more flexible than a material of the cover, a support head that is connected to the support body and detachable from the cover body, and an attachment part that is connected to the support body, wherein the attachment part is configured to be positioned on an opposite side of the support head with respect to the support body and is configured to pass through the cover hole so as to be attachable to an outer surface of the support body; and an elastic layer that is partially fixed to the support and that is movable relative to the cover, wherein the elastic layer is configured to provide an elastic force to the support before the support head and the cover are coupled to each other to assist coupling the support head to the cover, and wherein a portion of the elastic layer is fixed to an inner surface of the support body, and another portion of the elastic layer is slidable along an inner surface of the cover body.

2. The wearable module of claim 1, wherein the wearable module is configured so that as a distance between the support head and the cover increases when the support head and the cover are detached, a potential energy of the elastic layer increases.

3. The wearable module of claim 1, wherein the support head is formed of a material more rigid than a material of the support body.

4. The wearable module of claim 1, wherein the support is detachable from the cover via magnetic force.

5. The wearable module of claim 1, further comprising:

a main guide connected to the cover and configured to guide sliding of the elastic layer.

6. The wearable module of claim 5, wherein the elastic layer is configured to move toward the support head while the attachment part moves toward the support head by passing through the cover, based on a state in which the support head is mounted on the cover.

7. The wearable module of claim 5, further comprising:

a cushion part connected to the main guide and positioned on an opposite side of the support body with respect to the main guide.

8. The wearable module of claim 7, wherein the potential energy of the elastic layer is lowest in a state in which the support head is mounted on the cover.

9. The wearable module of claim 1, comprising:

an auxiliary guide connected to the support and configured to guide a movement of the elastic layer.

10. The wearable module of claim 9, further comprising:

a belt having a first portion fixed to the cover and another portion fixed to the support or the auxiliary guide.

11. The wearable module of claim 10, further comprising:

a belt guide connected to the support and configured to support the belt.

12. A motion assistance device comprising:

a main frame;

an actuator disposed on the main frame;

a driving frame rotatable by the actuator; and the wearable module of claim 1.

13. The motion assistance device of claim 12, wherein the main frame is configured to support a waist of a user, and the cover and the support are configured to at least partially wrap around a thigh of the user.

14. A wearable device comprising:

a waist wearable support configured to be worn proximate a waist of a user;

an actuator comprising a motor;

a driving frame configured to transmit an assistance force from the actuator; and a wearable module operatively connected to the driving frame and configured to be worn on a thigh of the user;

wherein the wearable module comprises:

a cover comprising a cover body, and a cover hole formed through the cover body;

a support comprising: a support body comprising a material that is more flexible than a material of the cover, a support head that is connected to the support body and detachable from the cover body, and an attachment part that is connected to the support body, wherein the attachment part is configured to be positioned on an opposite side of the support head with respect to the support body and is configured to pass through the cover hole so as to be attachable to an outer surface of the support body; and an elastic layer that is partially fixed to the support and that is movable relative to the cover, wherein the elastic layer is configured to provide an elastic force to the support before the support head and the cover are coupled to each other to assist coupling the support head to the cover, and wherein a portion of the elastic layer is fixed to an inner surface of the support body, and another portion of the elastic layer is slidable along an inner surface of the cover body.

* * * * *